United States Patent
Basil et al.

(10) Patent No.: US 9,881,156 B2
(45) Date of Patent: *Jan. 30, 2018

(54) DETECTING HEAP SPRAYING ON A COMPUTER

(71) Applicant: International Business Machines Corporation, Armonk, NY (US)

(72) Inventors: Zohar Basil, Rehovot (IL); Amit Klein, Herzliya (IL); Ron Peleg, Kfar Bilu (IL); Shmuel Regev, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/089,618

(22) Filed: Apr. 4, 2016

(65) Prior Publication Data

US 2016/0217284 A1    Jul. 28, 2016

Related U.S. Application Data

(63) Continuation of application No. 14/472,537, filed on Aug. 29, 2014, now Pat. No. 9,372,990.

(51) Int. Cl.
*G06F 21/56* (2013.01)
*G06F 21/55* (2013.01)

(52) U.S. Cl.
CPC ......... *G06F 21/566* (2013.01); *G06F 21/554* (2013.01); *G06F 21/56* (2013.01)

(58) Field of Classification Search
CPC ... G06F 21/566; G06F 21/56; G06F 2221/034
USPC ......................................................... 726/23
See application file for complete search history.

(56) References Cited

U.S. PATENT DOCUMENTS

| | | | |
|---|---|---|---|
| 5,129,088 A | 7/1992 | Auslander et al. | |
| 5,949,972 A | 9/1999 | Applegate | |
| 6,154,823 A | 11/2000 | Benayon et al. | |
| 6,401,182 B1 | 6/2002 | Sweeney | |
| 6,499,094 B1 | 12/2002 | Fraser et al. | |
| 9,063,668 B1 | 6/2015 | Jung et al. | |
| 9,202,054 B1 * | 12/2015 | Lu | G06F 21/566 |
| 9,438,623 B1 * | 9/2016 | Thioux | H04L 63/1466 |
| 2002/0091904 A1 | 7/2002 | Haggar et al. | |
| 2004/0250041 A1 | 12/2004 | Sollich | |
| 2009/0300764 A1 | 12/2009 | Freeman | |
| 2010/0205374 A1 | 8/2010 | Meka et al. | |
| 2010/0211756 A1 | 8/2010 | Kaminski et al. | |

(Continued)

OTHER PUBLICATIONS

IBM U.S. Appl. No. 14/472,537, filed Aug. 29, 2014.

(Continued)

*Primary Examiner* — Hadi Armouche
*Assistant Examiner* — Sakinah Taylor
(74) *Attorney, Agent, or Firm* — William H. Hartwell; Jose A. Medina-Cruz

(57) ABSTRACT

Detecting heap spraying on a computer by determining that values of characteristics of a plurality of requests to allocate portions of heap memory are consistent with benchmark values of the characteristics, wherein the benchmark values of the characteristics are associated with heap spraying; and performing a computer-security-related remediation action responsive to determining that the values of the characteristics are consistent with the benchmark values of the characteristics.

18 Claims, 3 Drawing Sheets

(56) References Cited

U.S. PATENT DOCUMENTS

| | | |
|---|---|---|
| 2010/0217946 A1 | 8/2010 | Condorelli et al. |
| 2013/0086299 A1 | 4/2013 | Epstein |
| 2014/0122052 A1 | 5/2014 | Liu |
| 2014/0123283 A1 | 5/2014 | Liu |
| 2014/0325177 A1 | 10/2014 | Winn |
| 2015/0047034 A1* | 2/2015 | Burnham ............ H04L 63/1441 726/23 |
| 2016/0062655 A1* | 3/2016 | Landau ................... G06F 21/79 711/154 |
| 2016/0063245 A1 | 3/2016 | Basil et al. |

OTHER PUBLICATIONS

Appendix P List of IBM Patents or Patent Applications Treated as Related. Apr. 4, 2016. pp. 2.

Gadaleta, Francesco et al.; "BuBBle: A Javascript Engine Level Countermeasure against Heap-Spraying Attacks"; ESSos 2010; LNCS 5965; pp. 1-17, 2010; Copyright Springer-Verlag Berlin Heidelberg 2010.

Wikipedia; "Heap spraying\h"; Wkipedia, the free encyclopedia; Printed Apr. 24, 2014; <http://en.wikipedia.org/wiki/Heap_spraying\h>.

* cited by examiner

DETECTING HEAP SPRAYING ON A COMPUTER

STATEMENT REGARDING PRIOR DISCLOSURES BY THE INVENTOR OR A JOINT INVENTOR

Various aspects of the present invention have been disclosed by an inventor or a joint inventor in the product Trusteer Apex v1307, made publically available on Apr. 23, 2014. This disclosure is submitted under 35 U.S.C. 102(b)(1)(A).

FIELD OF THE INVENTION

The present invention relates generally to computer security, and more particularly, to detecting "heap spraying" on a computer.

BACKGROUND OF THE INVENTION

Many computer operating systems use what is called heap memory to store data used by software applications during their execution. The essential requirement of memory management is to provide ways to dynamically allocate portions of memory to programs at their request, and free it for reuse when no longer needed. The task of fulfilling an allocation request consists of locating a block of unused memory of sufficient size. Memory requests are satisfied by allocating portions from a large pool of memory called the heap (e.g., heap memory) or free store. At any given time, some parts of the heap memory are in use, while some are "free" (unused) and thus available for future allocations.

SUMMARY

In one aspect of the present invention a method is provided for detecting heap spraying on a computer, the method includes detecting, by one or more processors, a plurality of requests to allocate portions of heap memory. The method further includes measuring, by one or more processors, the plurality of requests to determine a value of a characteristic of the plurality of requests. The method further includes identifying, by one or more processors, an activity consistent with heap spraying by determining that the value of the characteristic is consistent with a benchmark value of the characteristic, wherein the benchmark value of the characteristic is associated with heap spraying. The method further includes performing, by one or more processors, a computer-security-related remediation action responsive to determining that the value of the characteristic is consistent with the benchmark value of the characteristic.

In other aspects of the invention systems and computer program products embodying the invention are provided.

BRIEF DESCRIPTION OF THE SEVERAL VIEWS OF THE DRAWINGS

Aspects of the present invention will be understood and appreciated more fully from the following detailed description taken in conjunction with the appended drawings in which.

DETAILED DESCRIPTION

Figure 1:
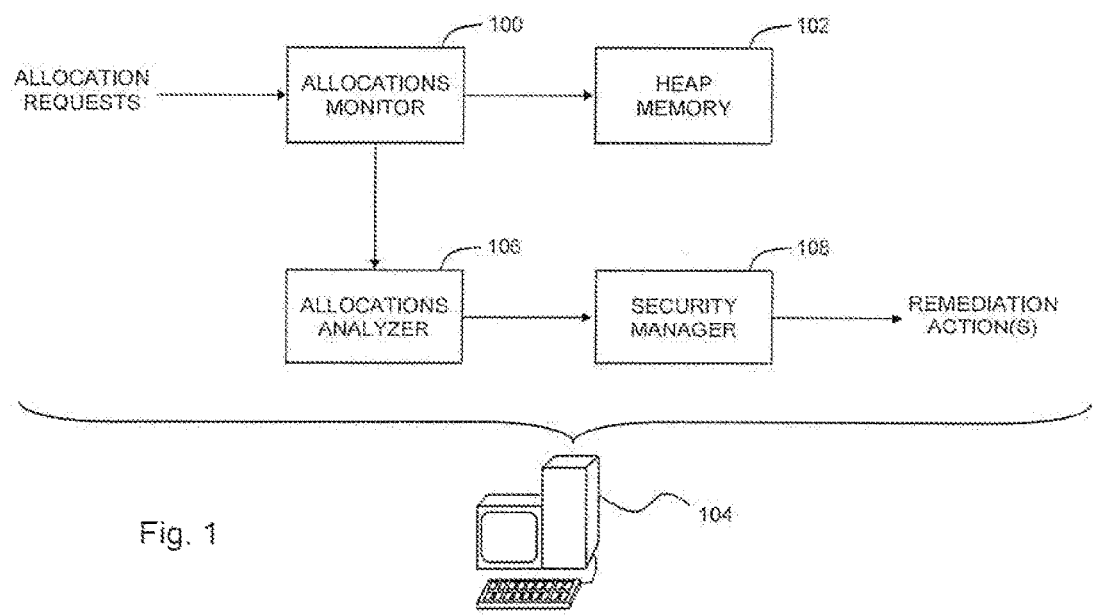
FIG. 1 is a simplified conceptual illustration of a system for detecting heap spraying on a computer, constructed and operative in accordance with an embodiment of the present invention.

Embodiments of the present invention recognize that in order to take advantage of certain computer security vulnerabilities, designers of malicious software applications have developed a method known as "heap spraying" whereby data that includes malicious instructions are stored in a computer's heap memory to facilitate a later attack. In a typical heap spraying operation, multiple copies of such data are stored in heap memory to increase the likelihood that program execution flow will encounter one of the copies of the data and execute the instructions. Embodiments of the present invention allow for detecting heap spraying on a computer. Implementation of embodiments of the invention may take a variety forms, and exemplary implementation details are discussed subsequently with reference to the Figures.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1 which is a simplified conceptual illustration of a system for detecting heap spraying on a computer, constructed and operative in accordance with an embodiment of the present invention. In the system of FIG. 1, an allocations monitor 100 is configured to detect requests to allocate portions of a heap memory 102, memory within a computer memory of a computer 104, where each of the allocation requests is a request to allocate a portion of heap memory 102, typically for the purpose of storing an allocation data payload in the requested allocation portion. Allocations monitor 100 is preferably configured to detect such allocation requests, such as may be made by a computer software application during its execution by a computer, by intercepting calls to low-level memory allocation functions, such as to VirtualAllocEx and VirtualAlloc on computers running the MICROSOFT WINDOWS™ operating system, although the invention is applicable to other operating systems that are vulnerable to heap spraying. Optionally, allocations monitor 100 is configured to prevent such calls from being serviced by their called memory allocation functions. Allocations monitor 100 is also preferably configured to store each detected allocation request in a data structure or data file, together with an identification of the requesting process and a timestamp indicating the time that the allocation request was made. Allocations monitor 100 is also preferably configured to remove any such stored allocation requests where a deallocation request is detected that corresponds to a stored allocation request.

The system of FIG. 1 also includes an allocations analyzer 106 configured to periodically measure the detected allocation requests made by a given process, such as after detecting a predefined number of allocation requests, such as 1,000 allocation requests, to determine a value of one or more predefined characteristics of the allocation requests. Allocations analyzer 106 is preferably configured to perform the measurements on one or more groups of detected allocations requests, where a group of allocation requests is defined as those allocation requests that belong to the same time window of a predefined duration, such as 780 milliseconds, and preferably where the number of detected allocations request that belong to a group meets or exceeds a minimum, such as 300. In various embodiments, which may be employed individually or in any combinations thereof, allocations analyzer 106 is configured to:

measure the detected allocation requests in a group to determine the number of the allocation requests that request memory allocations of the same size;

specify multiple byte positions within an allocation data payload, such as the first eight bytes of an allocation data payload, and measure the detected allocation requests in a group to determine the number of the allocation data payloads that have the same bytes at the same specified byte positions;

measure the detected allocation requests in a group to determine the number of the allocation requests that are requests for allocations on executable pages within heap memory 102.

Allocations analyzer 106 is also configured to determine whether the value of any of the characteristics described hereinabove is consistent with a predefined benchmark value of the characteristic that is associated with heap spraying, where this determination represents an identification of activity that is consistent with heap spraying. Thus, for example, any of the following benchmark values may be used to identify activity that is consistent with heap spraying when:

- a predefined percentage, such as 90% or more, of the allocation data payloads in a group of allocation requests are of the same size;
- a predefined percentage, such as 90% or more, of the allocation data payloads in a group of allocation requests have the same bytes at the same specified byte positions;
- a predefined percentage, such as 90% or more, of the allocation requests in a group of allocation requests are requests for allocations on executable pages within heap memory 102.

Allocations analyzer 106 is preferably configured to release to their called memory allocation functions any intercepted allocation requests that are not determined to be associated with activity that is consistent with heap spraying.

The system of FIG. 1 also includes a security manager 108 configured to perform one or more predefined computer-security-related remediation actions in response to the identification of activity that is consistent with heap spraying as described hereinabove. For example, for any group of allocation requests regarding which activity that is consistent with heap spraying is detected as described hereinabove, the remediation actions may include any of:

- replacing their corresponding allocation data payloads with benign instructions (e.g., NOPs);
- terminating any process that is the source of any of the allocation requests;
- providing a computer-security-related notification reporting the activity, such as to a user or administrator of computer 104.

Any of the elements shown in FIG. 1 are preferably implemented by one or more computers, such as by computer 104, in computer hardware and/or in computer software embodied in a computer readable storage medium in accordance with conventional techniques.

Figure 2:
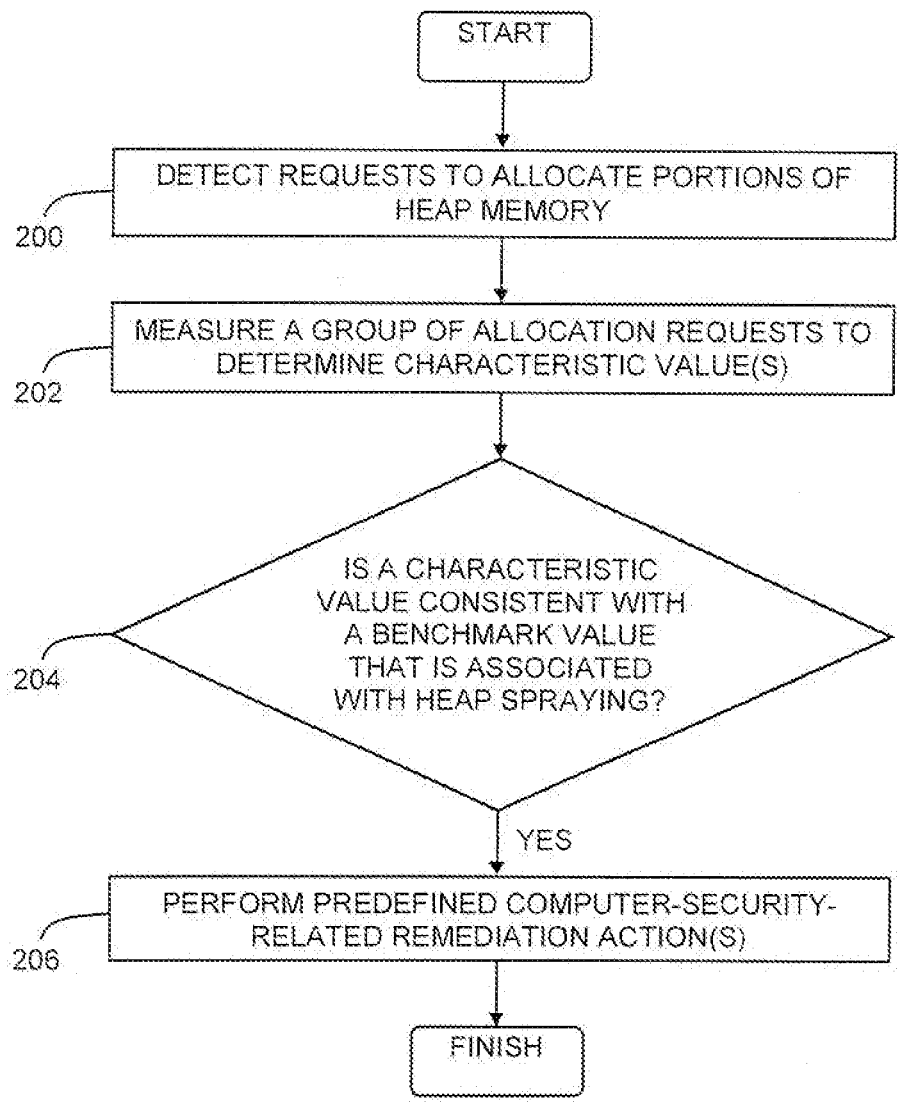
FIG. 2 is a simplified flowchart illustration of an exemplary method of operation of the system of FIG. 1, operative in accordance with an embodiment of the present invention.

Reference is now made to FIG. 2 which is a simplified flowchart illustration of an exemplary method of operation of the system of FIG. 1, operative in accordance with an embodiment of the present invention. In the method of FIG. 2, requests to allocate portions of a heap memory are detected (step 200). A group of allocation requests made by a given process in a given time window is measured to determine a value of one or more predefined characteristics of the allocation requests (step 202). If the value of any of the characteristics is consistent with a predefined benchmark value of the characteristic that is associated with heap spraying (step 204), then one or more predefined computer-security-related remediation actions are performed (step 206), which may include any of: replacing the allocation data payloads that correspond to the allocation requests with benign instructions (e.g., NOPs) or otherwise preventing execution of instructions in such data; terminating any process that is the source of any of the allocation requests; and providing a computer-security-related notification reporting that activity that is consistent with heap spraying has been detected.

Figure 3:
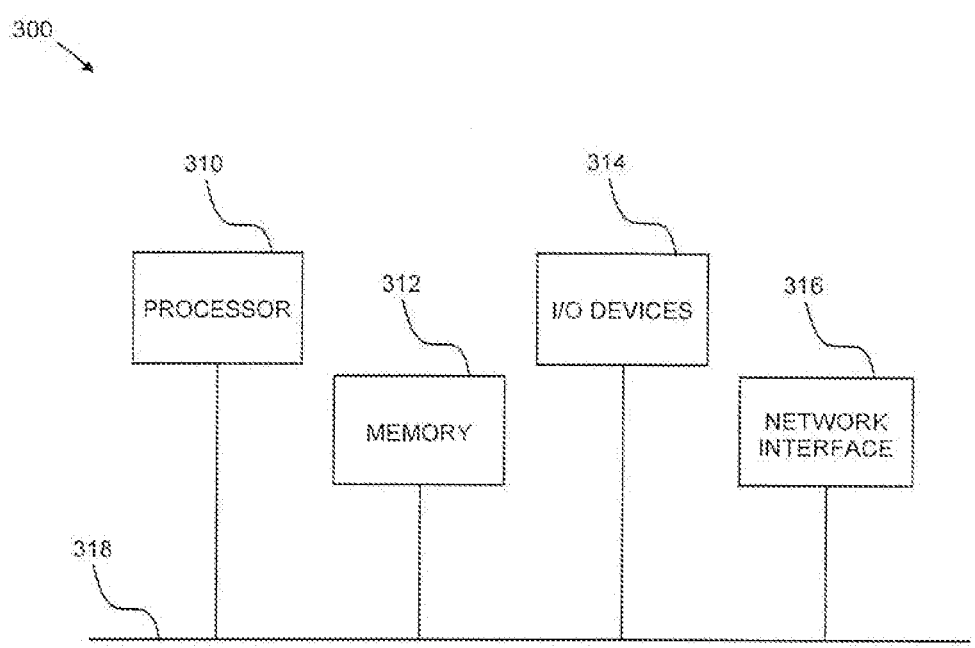
FIG. 3 is a simplified block diagram illustration of an exemplary hardware implementation of a computing system, constructed and operative in accordance with an embodiment of the present invention.

Referring now to FIG. 3, block diagram 300 illustrates an exemplary hardware implementation of a computing system in accordance with which one or more components/methodologies of the invention (e.g., components/methodologies described in the context of FIGS. 1-2) may be implemented, according to an embodiment of the present invention.

As shown, the techniques for controlling access to at least one resource may be implemented in accordance with a processor 310, a memory 312, I/O devices 314, and a network interface 316, coupled via a computer bus 318 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, by one or more processors, a plurality of requests to allocate portions of heap memory;
   measuring, by one or more processors, values of characteristics of the plurality of requests, wherein a value of a first characteristic comprises a number of requests of the plurality of requests whose requested allocations are of a same size, wherein a value of a second characteristic comprises a number of allocation data payloads that have one or more equal bytes at the same byte position, and wherein a value of a third characteristic comprises a number of requests of the plurality of requests that are requests for allocations on executable pages;

identifying, by one or more processors, an activity consistent with heap spraying by determining that the values of the characteristics are consistent with benchmark values of the characteristics, wherein the benchmark values of the characteristics are associated with heap spraying; and performing, by one or more processors, a computer-security-related remediation action responsive to determining that the values of the characteristics are consistent with the benchmark values of the characteristics.

2. The method of claim 1, further comprising:
detecting, by one or more processors, the plurality of requests to allocate portions of heap memory.

3. The method of claim 1, wherein the computer-security-related remediation action comprises replacing any allocation data payloads that correspond to the plurality of requests with benign instructions.

4. The method of claim 1, wherein the computer-security-related remediation action comprises preventing execution of instructions in any allocation data payloads that correspond to the plurality of requests.

5. The method of claim 1, wherein the computer-security-related remediation action comprises terminating any process that is a source of any request of the plurality of requests.

6. The method of claim 1, wherein the computer-security-related remediation action comprises providing a computer-security-related notification reporting the activity.

7. A computer program product comprising:
one or more computer readable storage media and program instructions stored on the one or more computer readable storage media, the program instructions comprising:
program instructions to receive a plurality of requests to allocate portions of heap memory;
program instructions to measure values of characteristics of the plurality of requests, wherein a value of a first characteristic comprises a number of requests of the plurality of requests whose requested allocations are of a same size, wherein a value of a second characteristic comprises a number of allocation data payloads that have one or more equal bytes at the same byte position, and wherein a value of a third characteristic comprises a number of requests of the plurality of requests that are requests for allocations on executable pages;
program instructions to identify an activity consistent with heap spraying by determining that the values of the characteristics are consistent with benchmark values of the characteristics, wherein the benchmark values of the characteristics are associated with heap spraying; and
program instructions to perform a computer-security-related remediation action responsive to determining that the values of the characteristics are consistent with the benchmark values of the characteristics.

8. The computer program product of claim 7, wherein the program instructions further comprise:
program instructions to detect the plurality of requests to allocate portions of heap memory.

9. The computer program product of claim 7, wherein the computer-security-related remediation action comprises replacing any allocation data payloads that correspond to the plurality of requests with benign instructions.

10. The computer program product of claim 7, wherein the computer-security-related remediation action comprises preventing execution of instructions in any allocation data payloads that correspond to the plurality of requests.

11. The computer program product of claim 7, wherein the computer-security-related remediation action comprises terminating any process that is a source of any request of the plurality of requests.

12. The computer program product of claim 7, wherein the computer-security-related remediation action comprises providing a computer-security-related notification reporting the activity.

13. A computer system comprising:
one or more processors, one or more computer readable storage media, and program instructions stored on the one or more computer readable storage media for execution by at least one of the one or more processors, the program instructions comprising:
program instructions to receive a plurality of requests to allocate portions of heap memory;
program instructions to measure values of characteristics of the plurality of requests, wherein a value of a first characteristic comprises a number of requests of the plurality of requests whose requested allocations are of a same size, wherein a value of a second characteristic comprises a number of allocation data payloads that have one or more equal bytes at the same byte position, and wherein a value of a third characteristic comprises a number of requests of the plurality of requests that are requests for allocations on executable pages;
program instructions to identify an activity consistent with heap spraying by determining that the values of the characteristics are consistent with benchmark values of the characteristics, wherein the benchmark values of the characteristics are associated with heap spraying; and
program instructions to perform a computer-security-related remediation action responsive to determining that the values of the characteristics are consistent with the benchmark values of the characteristics.

14. The computer system of claim 13, wherein the program instructions further comprise:
program instructions to detect the plurality of requests to allocate portions of heap memory.

15. The computer system of claim 13, wherein the computer-security-related remediation action comprises replacing any allocation data payloads that correspond to the plurality of requests with benign instructions.

16. The computer system of claim 13, wherein the computer-security-related remediation action comprises preventing execution of instructions in any allocation data payloads that correspond to the plurality of requests.

17. The computer system of claim 13, wherein the computer-security-related remediation action comprises terminating any process that is a source of any request of the plurality of requests.

18. The computer system of claim 13, wherein the computer-security-related remediation action comprises providing a computer-security-related notification reporting the activity.

* * * * *